US012684423B2

(12) United States Patent
Fujishiro et al.

(10) Patent No.: US 12,684,423 B2
(45) Date of Patent: Jul. 14, 2026

(54) COMMUNICATION CONTROL METHOD

(71) Applicant: KYOCERA Corporation, Kyoto (JP)

(72) Inventors: Masato Fujishiro, Yokohama (JP);
Henry Chang, San Diego, CA (US)

(73) Assignee: KYOCERA Corporation, Kyoto (JP)

( * ) Notice: Subject to any disclaimer, the term of this
patent is extended or adjusted under 35
U.S.C. 154(b) by 443 days.

(21) Appl. No.: 18/303,820

(22) Filed: Apr. 20, 2023

(65) Prior Publication Data

US 2023/0262533 A1      Aug. 17, 2023

Related U.S. Application Data

(63) Continuation of application No.
PCT/JP2021/038739, filed on Oct. 20, 2021.

(60) Provisional application No. 63/094,437, filed on Oct.
21, 2020.

(51) Int. Cl.
*H04W 36/00*          (2009.01)

(52) U.S. Cl.
CPC .............................. *H04W 36/0007* (2018.08)

(58) Field of Classification Search
CPC ............ H04W 36/0007; H04W 36/08; H04W
28/0268; H04W 28/06; H04W 80/02;
H04W 36/0235; H04W 4/06; H04W
76/20; H04W 76/40; H04W 76/27; H04L
1/1642; H04L 47/34; Y02D 30/70
USPC .......................... 370/312, 328, 329, 330, 331
See application file for complete search history.

(56) References Cited

U.S. PATENT DOCUMENTS

| | | | | |
|---|---|---|---|---|
| 9,867,096 B2 * | 1/2018 | Susitaival | ............. | H04W 76/27 |
| 12,207,080 B2 * | 1/2025 | Wang | ................... | H04L 12/189 |
| 2008/0310368 A1 * | 12/2008 | Fischer | ................ | H04W 36/02 370/331 |
| 2023/0300938 A1 * | 9/2023 | Latheef | ................... | H04W 4/06 370/329 |
| 2023/0388866 A1 * | 11/2023 | Di Gorolamo | ... | H04W 36/0007 |

OTHER PUBLICATIONS

3rd Generation Partnership Project; Technical Specification Group
Radio Access Network; NR; NR and NG-RAN Overall Description;
Stage 2 (Release 16), 3GPP TS 38.300 V16.3.0 (Sep. 2020), total
148 pages, Sep. 2020.
Mediatek Inc., "Scenarios and Requirements for Mobility with
Service Continuity", 3GPP TSG-RAN WG2 Meeting #111 elec-
tronic, R2-2006827, Online, Aug. 17- 28, 2020, retrieval date: Nov.
10, 2021, Internet<URL:https:/ /www.3gpp.org/ftp/tsg_ran/WG2_
RL2/TSGR2_111-e/Docs/R2-2006827.zip>.

(Continued)

*Primary Examiner* — David Q Nguyen
(74) *Attorney, Agent, or Firm* — Studebaker Brackett
PLLC

(57) ABSTRACT

A communication control method is used in a mobile
communication system for providing a multicast broadcast
service (MBS) from a base station to user equipment, and
includes receiving, by the base station from a core network
or another base station, a specific Packet Data Convergence
Protocol (PDCP) sequence number specified to be applied to
an MBS packet; associating, by the base station, the MBS
packet with the specific PDCP sequence number; and trans-
mitting, by the base station to the user equipment, the MBS
packet associated with the specific PDCP sequence number.

2 Claims, 18 Drawing Sheets

(56) References Cited

OTHER PUBLICATIONS

Nokia Siemens Networks. Nokia, "Session Start Handling for Improved GGSN Solution", 3GPP TSG RAN WG3 Meeting #60, R3-081271, Online, May 5-9, 2008, retrieval date: Nov. 10, 2021, Internet<URL:http://www.3gpp.org/ftp/tsg_ran/WG3_lu/TSGR3_60/docs/R3-081271.zip>.

Nokia. Nokia Siemens Networks, "Using GTP-U header fields for PDCP SN forwarding on X2 and S1 interface", 3GPP TSG-RAN WG3 Meeting #57, R3-071574, Online, Aug. 20-24, 2007, retrieval date: Nov. 10, 2021, Internet<URL:http://www.3gpp.org/ftp/tsg_ran/WG3_lu/TSGR3_57/docs/R3-071574.zip>.

Ericsson, "KI#1: Update to Sol#2", SA WG2 Meeting #140E, S2-2006045, Online, Aug. 19-Sep. 1, 2020, E-Meeting, retrieval date: Dec. 17, 2021, Internet<URL:https://www.3gpp.org/ftp/tsg_sa/WG2_Arch/TSGS2_140e_Electronic/Docs/S2-2006045.zip>.

NEC, "Detail of MBMS Paging using TMGI", Joint RAN2/RAN3 MBMS Ad Hoc, R2-030026, Online, Jan. 15-16, 2003, retrieval date: Dec. 17, 2021, Internet<URL:http://www.3gpp.org/ftp/tsg_ran/WG2_RL2/TSGR2_AHs/2003_01_MBMS/Docs/R2-030026.zip>.

Qualcomm Incororporated, "Solution to KI#9: Switching to unicast transport for mobility to E-UTRAN/EPC.", SA WG2 Meeting #140E, S2-2006327, Online, E-Meeting, Aug. 19-Sep. 1, 2020, retrieval date: Dec. 17, 2021, Internet<URL:https://www.3gpp.org/ftp/tsg_sa/WG2_Arch/TSGS2_140e_Electronic/Docs/S2-2006327.zip>.

Ericsson, "MBMS SI—Solution on location reporting", 3GPP TSG-SA WG6 Meeting #14, S6-161556, Online, Nov. 14-18, 2016, retrieval date: Dec. 17, 2021, Internet<URL:http://www.3gpp.org/ftp/tsg_sa/WG6_MissionCritical/TSGS6_014_Reno/Docs/S6-161556.zip>.

Ericsson, "Mobility for NR MBS", 3GPP TSG-RAN WG2 #111e, R2-2007628, Electronic meeting, Aug. 17-28, 2020, total 5 pages.

* cited by examiner

COMMUNICATION CONTROL METHOD

RELATED APPLICATIONS

The present application is a continuation based on PCT Application No. PCT/JP2021/038739, filed on Oct. 20, 2021, which claims the benefit of U.S. Provisional Application No. 63/094,437 filed on Oct. 21, 2020. The content of which is incorporated by reference herein in their entirety.

TECHNICAL FIELD

The present invention relates to a communication control method used in a mobile communication system.

BACKGROUND OF INVENTION

In recent years, a mobile communication system of the fifth generation (5G) has attracted attention. New Radio (NR), which is Radio Access Technology (RAT) of the 5G System, has features such as high speed, large capacity, high reliability, and low latency compared to Long Term Evolution (LTE), which is fourth generation radio access technology.

CITATION LIST

Non-Patent Literature

NPL 1: 3GPP Technical Specification "3GPP TS 38.300 V16.3.0 (2020-09)"

SUMMARY

In a first aspect, a communication control method is used in a mobile communication system for providing a multicast broadcast service (MBS) from a base station to user equipment, and includes receiving, by the base station from a core network or another base station, a specific Packet Data Convergence Protocol (PDCP) sequence number specified to be applied to an MBS packet; associating, by the base station, the MBS packet with the specific PDCP sequence number; and transmitting, by the base station to the user equipment, the MBS packet associated with the specific PDCP sequence number.

In a second aspect, a communication control method is used in a mobile communication system for providing a multicast broadcast service (MBS) from a base station to user equipment, and includes receiving, by the base station from a core network, a paging message requesting paging the user equipment in a Radio Resource Control (RRC) idle state or an RRC inactive state; and performing, by the base station, the paging in response to reception of the paging message, wherein the paging message includes an identifier related to an MBS session received by the user equipment.

In a third aspect, a communication control method is used in a mobile communication system for providing a multicast broadcast service (MBS) from a base station to user equipment, and includes transmitting, by the base station, MBS data received from a core network to the user equipment by Point To Multipoint (PTM); transmitting, by the base station, a notification to the user equipment when determining that continuing PTM transmission of the MBS data from the base station to the user equipment is not possible; and establishing, by the user equipment with the core network, a unicast session for receiving the MBS data by unicast in response to reception of the notification.

In a fourth aspect, a communication control method is used in a mobile communication system for providing a multicast broadcast service (MBS) from a base station to user equipment, and includes receiving, by the user equipment from a cell, MBS control information used to receive MBS data and a control area identifier indicating an MBS control area coverage being an area coverage where at least a part of the MBS control information is applicable; and re-receiving, by the user equipment, the MBS control information when determining that a predetermined condition related to the MBS control area coverage is satisfied.

DESCRIPTION OF EMBODIMENTS

The introduction of multicast broadcast services to the 5G system (NR) is being studied. NR multicast broadcast services are expected to improve upon LTE multicast broadcast services.

The present invention provides improved multicast broadcast services.

A mobile communication system according to an embodiment will be described with reference to the drawings. In the description of the drawings, the same or similar parts are denoted by the same or similar reference signs.

Configuration of Mobile Communication System

Figure 1:
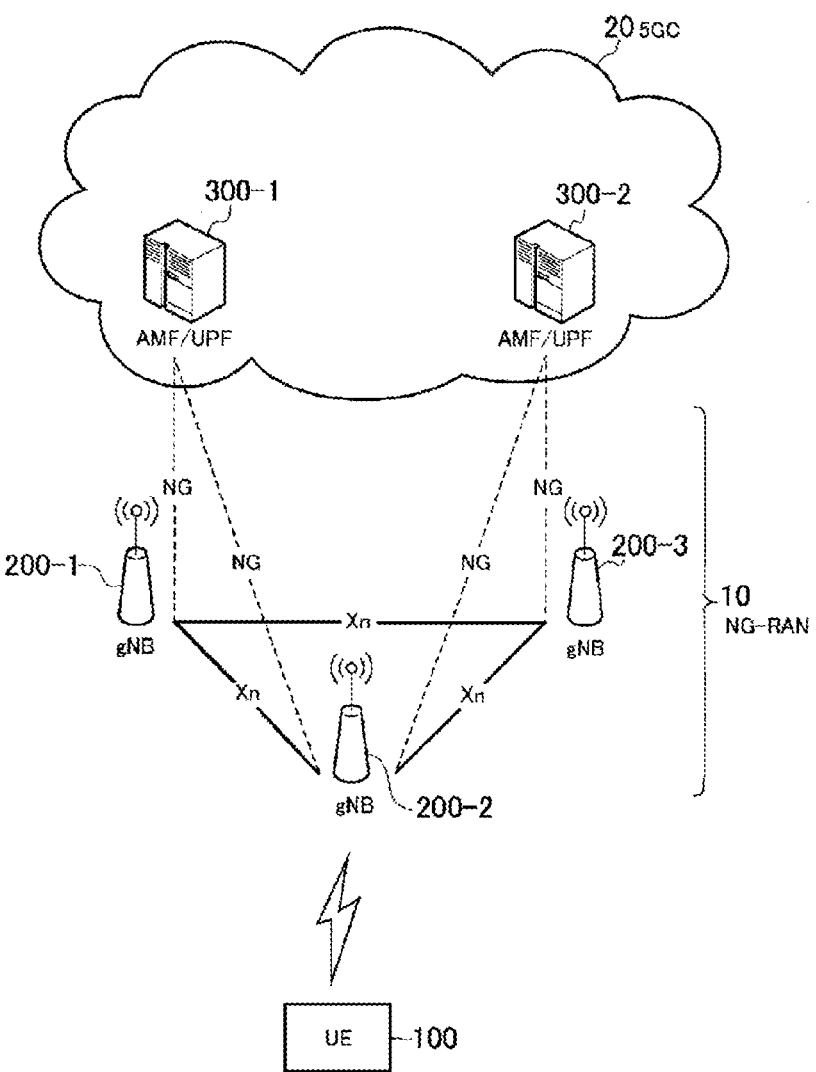
FIG. 1 is a diagram illustrating a configuration of a mobile communication system according to an embodiment.

First, a configuration of a mobile communication system according to an embodiment will be described. FIG. 1 is a diagram illustrating the configuration of the mobile communication system according to the embodiment. This mobile communication system conforms to the 5th Generation System (5GS) of the 3GPP standard. The description below takes the 5GS as an example, but a Long Term Evolution (LTE) system or a 6th Generation (6G) System may be at least partially applied to the mobile communication system.

As illustrated in FIG. 1, the mobile communication system includes user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as the UE 100 is utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. Each gNB 200 is interconnected via an Xn interface which is an inter-base station interface. The gNB 200 manages one or a plurality of cells. The gNB 200 performs wireless communication with the UE 100 that has established a connection to the cell of the gNB 200. The gNB 200 has a radio resource management (RRM) function, a user data (hereinafter simply referred to as "data") routing function, a measurement control function for mobility control and scheduling, and the like. "Cell" is used as a term indicating the minimum unit of a wireless communication area. "Cell" is also used as a term indicating a function or a resource for performing wireless communication with the UE 100. One cell belongs to one carrier frequency.

Note that the gNB can be connected to an Evolved Packet Core (EPC) which is a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 through communicating with the UE 100 by using Non-Access Stratum (NAS) signaling. The UPF controls data transfer. The AMF and UPF are connected to the gNB 200 via an NG interface which is an interface between a base station and the core network.

Figure 2:
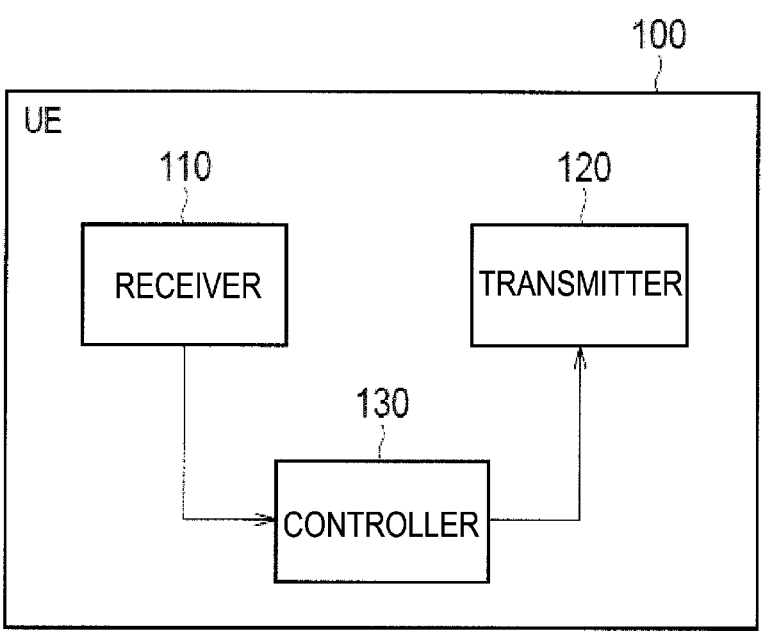
FIG. 2 is a diagram illustrating a configuration of user equipment (UE) according to the embodiment.

FIG. 2 is a diagram illustrating a configuration of the UE 100 (user equipment) according to the embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal from the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to perform various types of processing.

Figure 3:
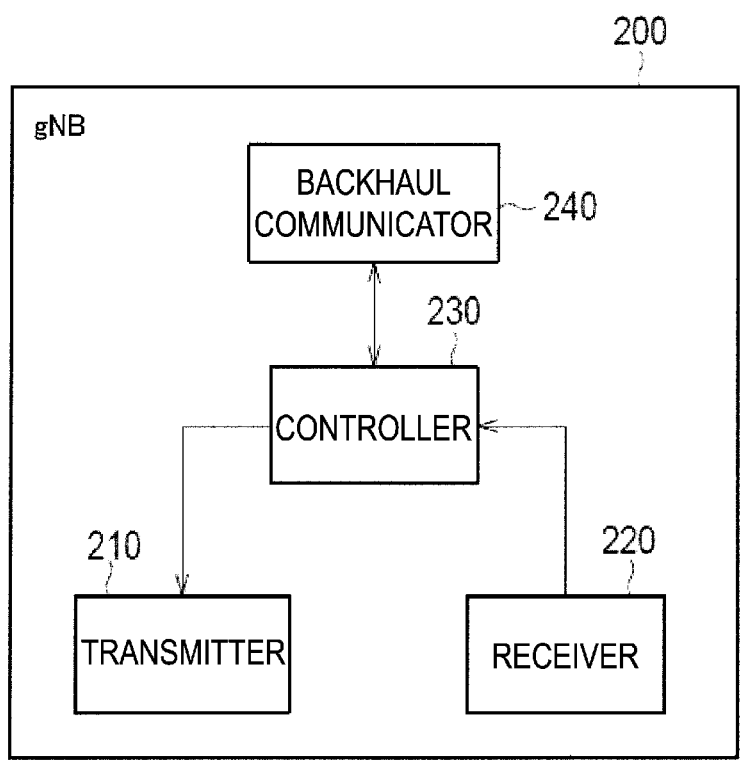
FIG. 3 is a diagram illustrating a configuration of a base station (gNB) according to the embodiment.

FIG. 3 is a diagram illustrating a configuration of the gNB 200 (base station) according to the embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal from the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control in the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of the baseband signal. The CPU executes the program stored in the memory to perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
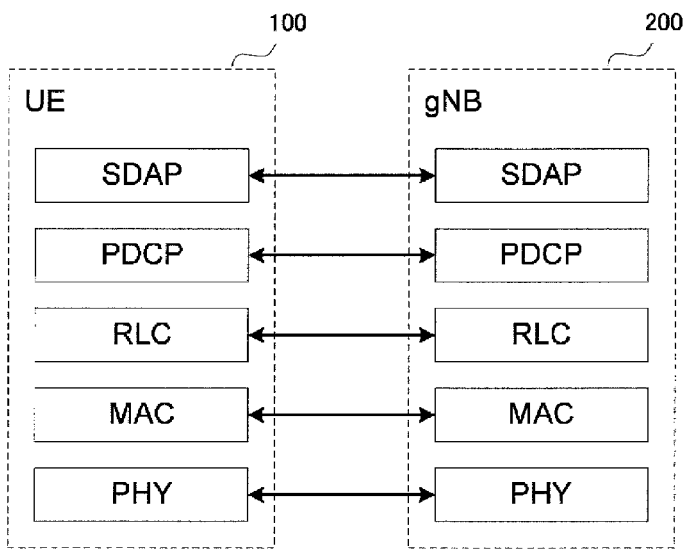
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs data priority control, retransmission processing using hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport format (transport block size, modulation and coding scheme (MCS)) in an uplink and downlink, and resource blocks to be allocated to the UE 100.

The RLC layer transmits data to the RLC layer on the reception side by using functionality of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as a unit of QoS control by a core network and a radio bearer as a unit of QoS control by an access stratum (AS). Note that when the RAN is connected to the EPC, the SDAP need not be provided.

Figure 5:
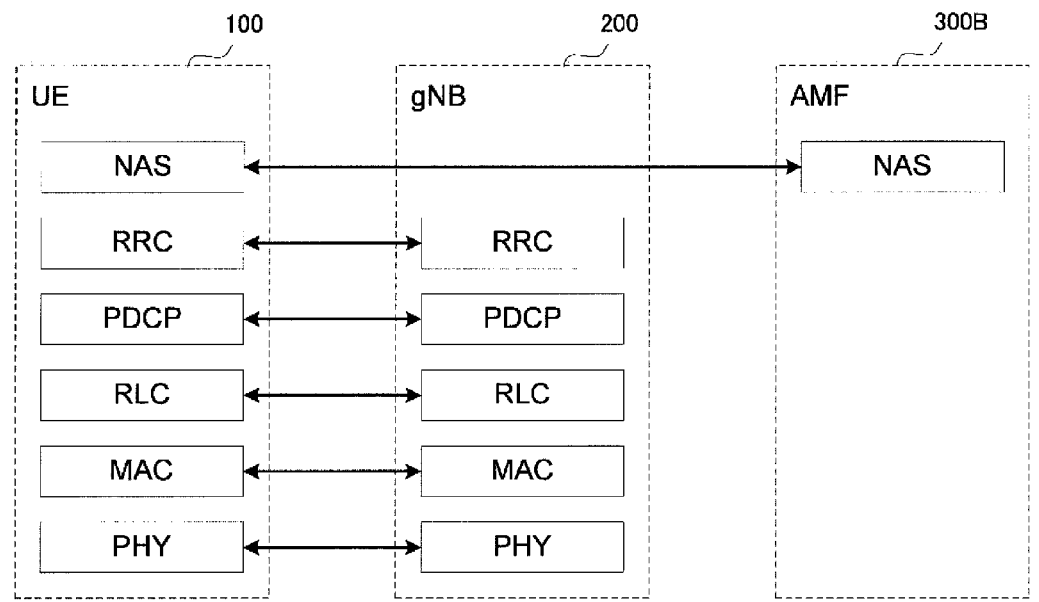
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel depending on establishment, reestablishment, and release of a radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. When the connection between the RRC of the UE 100 and the RRC of the gNB 200 is suspended, the UE 100 is in an RRC inactive state.

The NAS layer, which is positioned higher than the RRC layer, performs session management, mobility management, and the like. NAS signaling is transmitted between the NAS layer of the UE 100 and the NAS layer of the AMF 300B.

Note that the UE 100 includes an application layer other than the protocol of the radio interface.

MBS

Next, an MBS according to the embodiment will be described. The MBS is a service in which the NG-RAN 10 provides broadcast or multicast, in other words, point-to-multipoint (PTM) data transmission to the UE 100. The MBS may be referred to as Multimedia Broadcast and Multicast Service (MBMS). Note that use cases (service types) of the MBS include public communication, mission critical communication, V2X (Vehicle to Everything) communication, IPv4 or IPv6 multicast delivery, IPTV, group communication, and software delivery.

Figure 6:
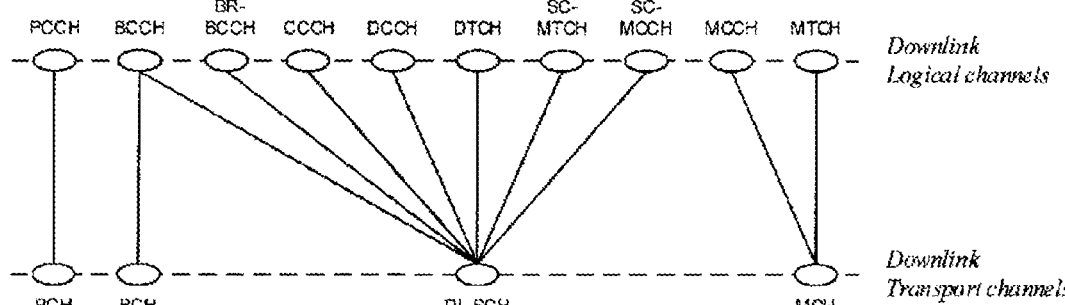
FIG. 6 is a diagram illustrating a correspondence relationship between a downlink Logical channel and a downlink Transport channel according to the embodiment.

MBS Transmission in LTE includes two schemes, i.e., Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to the embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Shared Channel (PDSCH), which enable dynamic resource allocation.

Although an example will be mainly described below in which the MBS is provided using the SC-PTM transmission scheme, the MBS may also be provided using the MBSFN transmission scheme. An example will be mainly described in which the MBS is provided using multicast. Accordingly, the MBS may be interpreted as multicast. Note that the MBS may be provided using broadcast.

MBS data refers to data transmitted by MBS, an MBS control channel refers to the MCCH or SC-MCCH, and an MBS traffic channel refers to the MTCH or SC-MTCH. However, the MBS data may be transmitted by unicast. The MBS data may be referred to as MBS traffic. Hereinafter, the MBS data as handled in a packet-based manner is referred to as an MBS packet.

The network can provide a different MBS service per MBS session. An MBS session is identified by at least one of a Temporary Mobile Group Identity (TMGI) and a session identifier, and at least one of these identifiers is referred to as an MBS session identifier. Such an MBS session identifier may be referred to as an MBS service identifier or a multicast group identifier.

Figure 7:
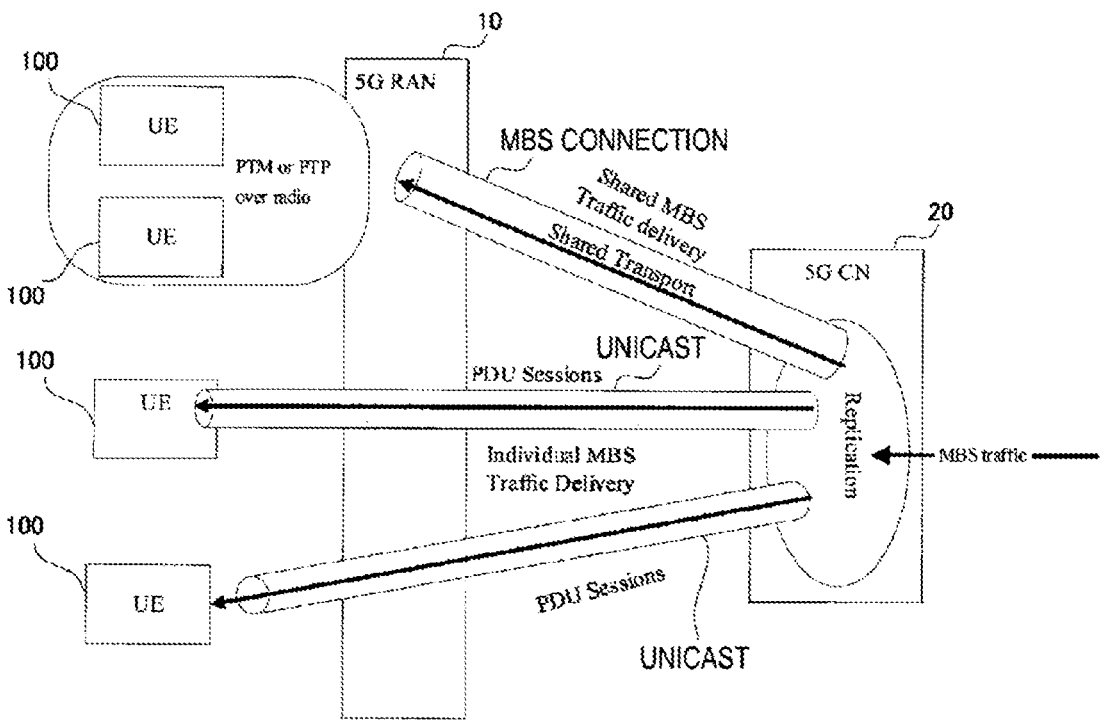
FIG. 7 is a diagram illustrating a method for delivering MBS data according to the embodiment.

FIG. 7 is a diagram illustrating a method for delivering MBS data according to the embodiment.

As illustrated in FIG. 7, the MBS data (MBS Traffic) is delivered from a single data source (application service provider) to a plurality of UEs. A 5G CN (5GC) 20, which is a 5G core network, receives the MBS data from the application service provider, duplicates (replicates) the MBS data, and delivers the duplicated MBS data.

From the perspective of the 5GC 20, two delivery methods are available: Shared MBS Traffic delivery and Individual MBS Traffic delivery.

In the shared MBS traffic delivery, a connection is established between the NG-RAN 10, which is a 5G radio access network (5G RAN), and the 5GC 20 to deliver the MBS data from the 5GC 20 to the NG-RAN 10. Such a connection (tunnel) is referred to as "MBS connection" below.

The MBS connection may be referred to as a Shared MBS Traffic delivery connection or shared transport. The MBS connection is terminated at the NG-RAN 10 (i.e., the gNB 200). The MBS connection may have a one-to-one correspondence with an MBS session. The gNB 200 selects one of Point-to-Point (PTP: unicast) and Point-to-Multipoint (PTM: multicast or broadcast) at the discretion of the gNB 200, and transmits the MBS data to the UE 100 by the selected method.

On the other hand, in the individual MBS traffic delivery, a unicast session is established between the NG-RAN 10 and the UE 100, and the MBS data is individually transmitted from the 5GC 20 to the UE 100. Such unicast may be referred to as a PDU session. The unicast (PDU session) is terminated at the UE 100.

Sequence Number Synchronization

Figure 8:
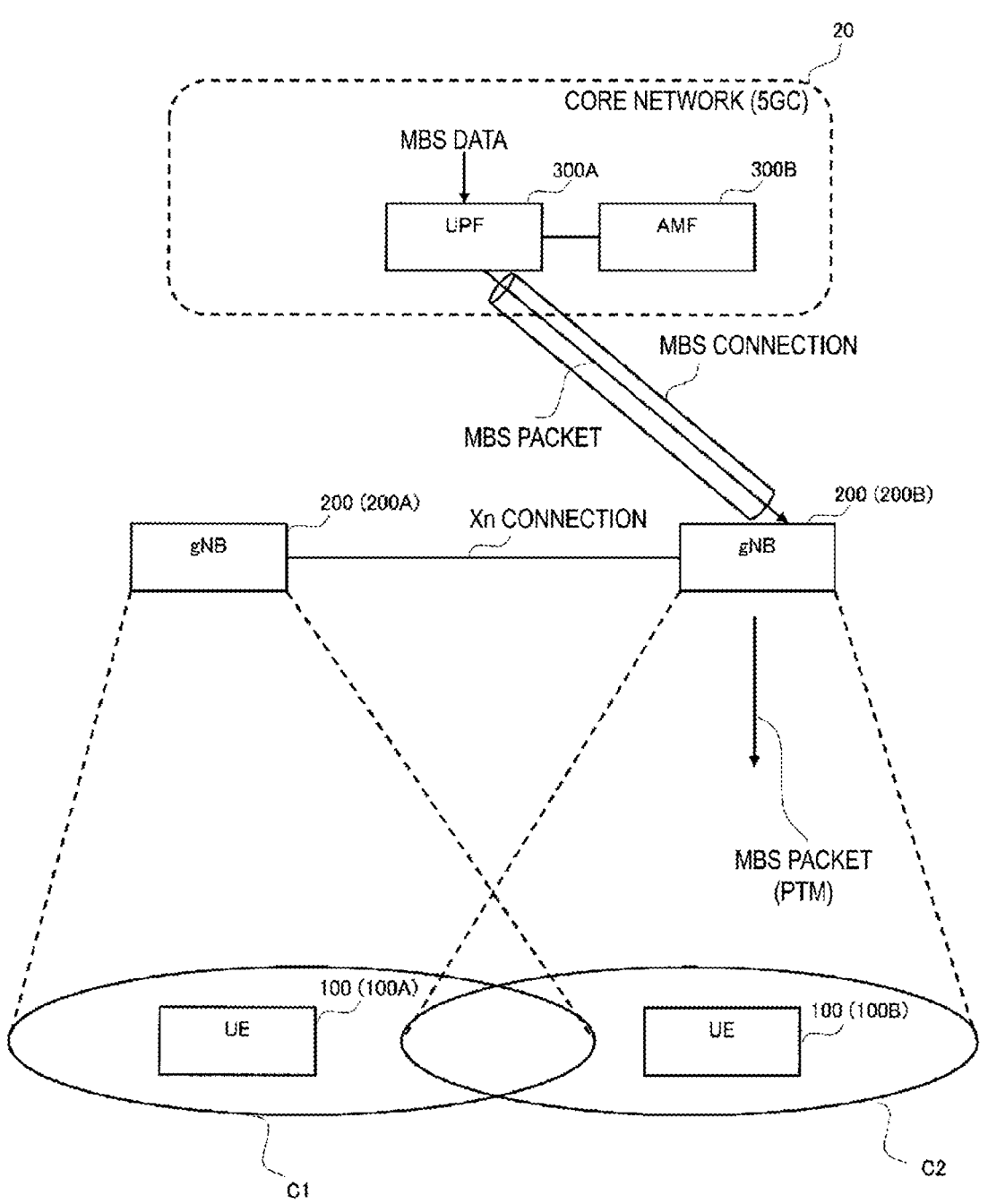
FIG. 8 is a diagram illustrating an operation environment according to an embodiment.
Figure 9:
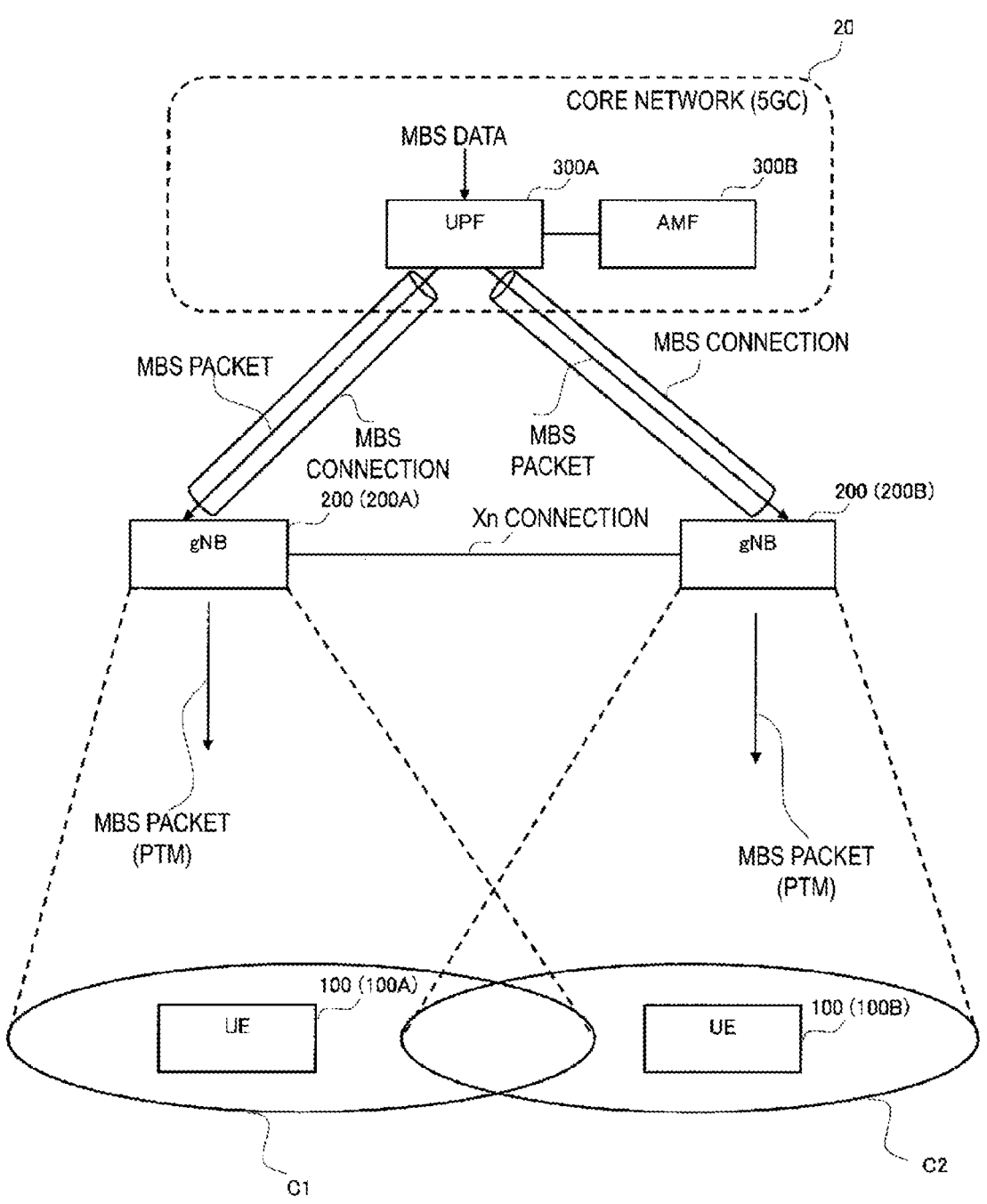
FIG. 9 is a diagram illustrating an operation environment according to the embodiment.

Next, sequence number synchronization according to an embodiment will be described. FIGS. 8 and 9 are diagrams each illustrating an operation environment according to the embodiment.

As illustrated in FIG. 8, a gNB 200A manages a cell C1, and a gNB 200B manages a cell C2. UE 100A exists in the cell C1 and UE 100B in the cell C2. The UE 100A can move from the cell C1 to the cell C2. Similarly, the UE 100B can move from the cell C2 to the cell C1.

Note that an example is illustrated in which the cell C1 and the cell C2 are equal in size, but the cell C1 and the cell C2 may also differ in size. The cell C1 and cell C2 have at least partially overlapping geographical regions. Such a relationship between cells may be referred to as neighbor cells. The UE 100A and UE 100B may be present in a region where the cells overlap.

The gNB 200A and the gNB 200B can communicate with each other via an Xn interface (Xn connection) which is an inter-base station interface. However, the communication between the gNB 200A and the gNB 200B is not limited to the Xn interface, and may also be performed via an NG interface and a core network apparatus which is a base station-core network interface. The description below focuses on an example in which the communication between the gNB 200A and the gNB 200B is performed via the Xn interface.

The cell C1 and the cell C2 may belong to the same MBS area. MBS area refers to an area including a plurality of cells in which the same MBS session is provided. The plurality of cells belonging to the same MBS area may provide an MBS session at the same frequency to form a Single Frequency Network (SFN).

Note that the establishment and release of the MBS connection is controlled by the AMF 300B. The AMF 300B is another example of a core network apparatus. However, a Session Management Function (SMF) may control the establishment and release of the MBS connection instead of the AMF 300B. The SMF is another example of a core network apparatus.

In such an environment, the gNB 200B has an MBS connection to the UPF 300A. The gNB 200B receives an MBS packet from the UPF 300A via the MBS connection and transmits the received MBS packet in the cell C2 by PTM. Here, a PDCP entity of the gNB 200B adds, to the MBS packet, a PDCP header having a PDCP sequence number (PDCP SN) and transmits the MBS packet. The PDCP SN is assumed to count up (increment) per MBS packet to be transmitted.

On the other hand, the gNB 200A has no MBS connection to the UPF 300A. Here, assuming that the SFN includes the cell C1 and the cell C2, the gNB 200A needs to establish an MBS connection to the UPF 300A, as illustrated in FIG. 9. MBS packets transmitted by the gNB 200A and the gNB 200B preferably have synchronized PDCP SNs. In other words, for MBS packets transmitted by MBS Shared Delivery, an air interface preferably performs PTM transmission by using PDCP SNs synchronized between a plurality of gNBs 200 (gNB 200A and gNB 200B).

However, the gNB 200B has started PTM transmission for a subject MBS session, with a value of the PDCP SN having increased. Accordingly, when the gNB 200A counts up the PDCP SN from an initial value (for example, 0), the PTM transmission cannot be performed with the PDCP SNs synchronized between the plurality of gNBs 200 (gNB 200A and gNB 200B).

In the embodiment, the core network therefore specifies the value of the PDCP SN of the MBS packet transmitted by the gNB 200A. Here, the 5GC 20 (core network) is assumed to recognize the current PDCP SN of the gNB 200B. The 5GC 20 specifies the value of the PDCP SN of the MBS packet transmitted by the gNB 200A in order to match the MBS packet transmitted by the gNB 200B and the PDCP SN of the MBS packet with the MBS packet transmitted by the gNB 200A and the PDCP SN of the MBS packet.

In order to recognize the current PDCP SN of the gNB 200B, the 5GC 20 may query the gNB 200B for information of the current PDCP SN. The query may include MBS session information. The gNB 200B may report the current PDCP SN information to the 5GC 20. The report may include the MBS session information. The reporting may be performed in response to receiving the query.

In the embodiment, the gNB 200A receives, from the 5GC 20, an MBS packet and a specific PDCP SN specified to be applied to the MBS packet, and associates the MBS packet with the specific PDCP SN. The gNB 200A transmits, to the UE 100, the MBS packet associated with the specific PDCP SN. For example, the gNB 200A configures the specific PDCP SN in the PDCP header of the MBS packet, and transmits, by PTM, the MBS packet with the specific PDCP SN configured in the PDCP header.

Figure 10:
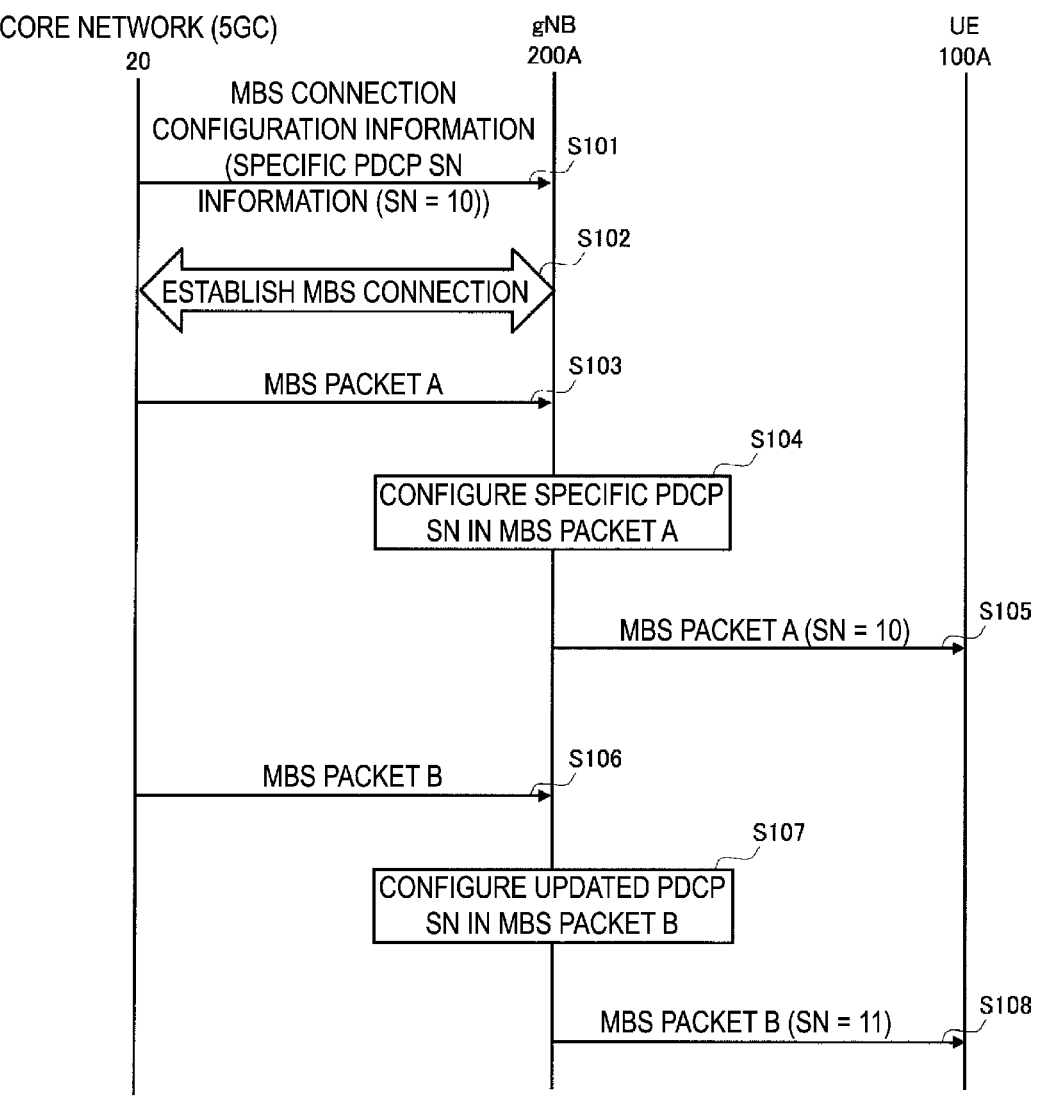
FIG. 10 is a diagram illustrating Operation Example 1 of sequence number synchronization according to the embodiment.

FIG. 10 is a diagram illustrating Operation Example 1 of the sequence number synchronization according to the embodiment.

As illustrated in FIG. 10, in step S101, the 5GC 20 (for example, the UPF 300A or AMF 300B) transmits, to the gNB 200A, configuration information for establishing an MBS connection (hereinafter referred to as "MBS connection configuration information"). In response to a request from the gNB 200A, the 5GC 20 may transmit the MBS connection configuration information to the gNB 200A.

The MBS connection configuration information includes configuration parameters of the MBS connection and specific PDCP SN information related to the specific PDCP SN. The MBS connection configuration information may include MBS session information associated with the specific PDCP SN information. The MBS session information includes an identifier related to the MBS session. Such an identifier may be a session identifier (e.g., TMGI), a QoS flow identifier, and/or a G-RNTI in PTM transmission. Based on the MBS session information, the gNB 200A can recognize the MBS session corresponding to the MBS connection to be established.

The specific PDCP SN information includes a specific PDCP SN specified to be applied to an MBS packet received first by the gNB 200 from the 5GC 20 via the MBS connection. In other words, the 5GC 20 specifies the initial value of the PDCP SN to be configured by the gNB 200A in the MBS packet. FIG. 10 illustrates an example in which the specific PDCP SN is "10". Note that when the 5GC 20 simultaneously transmits the MBS connection configuration information and the MBS packet to the gNB 200A, the specific PDCP SN information may include a specific PDCP SN specified to be applied to the current corresponding MBS packet.

Alternatively, the specific PDCP SN information may include information that associates the specific PDCP SN with the identifier assigned to the MBS packet received by the gNB 200 from the 5GC 20 via the MBS connection. The identifier assigned to the MBS packet may be a GTP SN included in a GTP header used in a GTP tunnel constituting the MBS connection and/or an SN included in an IP header of the MBS packet (IP packet). In the example of FIG. 10, the specific PDCP SN information may include a set of the identifier (for example, "A") assigned to an MBS packet A and the PDCP SN "10", and a set of the identifier (for example, "B") assigned to an MBS packet B and the PDCP SN "11".

Note that the specific PDCP SN information may include an SN length (bit length) of the PDCP SN. The SN length is, for example, 12 bits or 18 bits. By specifying the SN length, a timing (wrap around) at which the SN returns to zero can be synchronized.

In step S102, the gNB 200A establishes an MBS connection to the 5GC 20, based on the MBS connection configuration information from the 5GC 20.

In step S103, the 5GC 20 transmits the MBS packet A to the gNB 200A via the MBS connection. The gNB 200A receives the MBS packet A.

In step S104, based on the specific PDCP SN information from 5GC 20, a PDCP entity of gNB 200A configures the specific PDCP SN specified by the 5GC 20 in the PDCP header of the MBS packet A.

In step S105, the gNB 200A transmits, to the UE 100A by PTM, the MBS packet A with the specific PDCP SN configured in the PDCP header.

Subsequently, the gNB 200A updates the PDCP SN so that the PDCP SN counts up per MBS packet transmitted by the gNB 200A.

For example, in step S106, the 5GC 20 transmits the MBS packet B to the gNB 200A via the MBS connection. The gNB 200A receives the MBS packet B.

In step S107, the PDCP entity of the gNB 200A configures the updated PDCP SN (here, SN=11) in a PDCP header of the MBS packet B.

In step S108, the gNB 200A transmits, to the UE 100A by PTM, the MBS packet B with the updated PDCP SN configured in the PDCP header.

Note that in Operation Example 1, an example in which each gNB 200 transmits the MBS packet by PTP is described, but each gNB 200 may also transmit the MBS packet by PTM.

Next, Operation Example 2 of the sequence number synchronization according to the embodiment will be described. Operation Example 2 is an example in which the PDCP SN is synchronized before and after handover when the UE 100 performs handover. In the example described here, the UE 100 being in an RRC connected state performs handover from the gNB 200A to the gNB 200B.

In Operation Example 2, the gNB 200B serving as a target gNB receives, from the gNB 200A serving as a source gNB, the specific PDCP SN specified to be applied to the MBS packet, and associates the MBS packet with the specific PDCP SN. The gNB 200A transmits, to the UE 100, the MBS packet associated with the specific PDCP SN.

In Operation Example 2, the gNB 200B receives, from the UE 100 having performed handover from the gNB 200A to the gNB 200B, the PDCP SN of the MBS packet that the UE 100 has failed to receive in the gNB 200A. The gNB 200B transmits (retransmits), to the UE 100, the MBS packet associated with the PDCP SN received from the UE 100.

Figure 11:
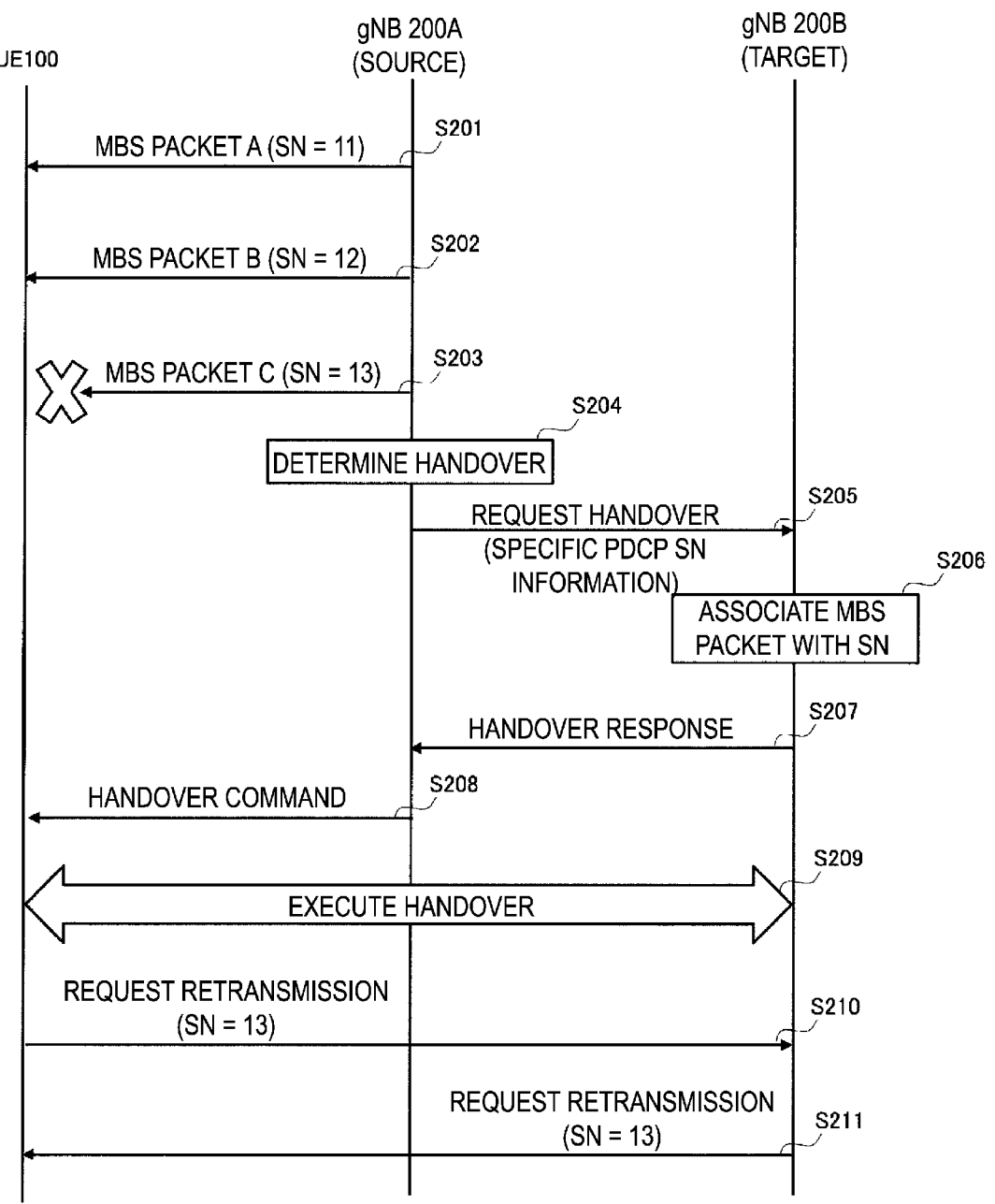
FIG. 11 is a diagram illustrating Operation Example 2 of the sequence number synchronization according to the embodiment.

FIG. 11 is a diagram illustrating Operation Example 2 of the sequence number synchronization according to the embodiment. In FIG. 11, each of the gNB 200A and gNB 200B is assumed to have an MBS connection to the UPF 300A and to receive the same MBS packet from the UPF

300A. However, the MBS packets transmitted by the gNB 200A and the gNB 200B are assumed to have asynchronous PDCP SNs.

As illustrated in FIG. 11, in steps S201 to S203, the gNB 200A transmits MBS packets A to C to the UE 100 by PTM. The PDCP SNs of the MBS packets A to C are "11" to "13". Here, the UE 100 is assumed to fail to receive the MBS packet C (for example, the UE 100 is assumed to detect a decoding error).

In step S204, the gNB 200A determines the UE 100 to perform handover to the gNB 200B.

In step S205, the gNB 200A transmits, to the gNB 200B, a handover request message for command the UE 100 to perform handover.

The handover request message includes specific PDCD SN information. The specific PDCP SN information may include information that associates the specific PDCP SN with the identifier assigned to the MBS packet received by the gNB 200A from the 5GC 20 via the MBS connection. The identifier assigned to the MBS packet may be the GTP SN included in the GTP header used in the GTP tunnel constituting the MBS connection and/or the SN included in the IP header of the MBS packet (IP packet). In the example of FIG. 11, the specific PDCP SN information may include a set of the identifier (e.g., "A") assigned to the MBS packet A and the PDCP SN "11", a set of the identifier (e.g., "B") assigned to the MBS packet B and the PDCP SN "12", and a set of the identifier (e.g., "C") assigned to the MBS packet C and the PDCP SN "13".

An example is described above in which the handover request message includes the specific PDCP SN information, but the gNB 200B may also acquire the specific PDCP SN information from the gNB 200A by querying the gNB 200A. The gNB 200B may acquire the specific PDCP SN information from the 5GC 20. In this case, the gNB 200B may acquire the specific PDCP SN information from the 5GC 20 by querying the 5GC 20.

In step S206, based on the specific PDCP SN information, the gNB 200B associates the specific PDCP SN with each MBS packet received by the gNB 200B from the 5GC 20 (UPF 300A).

In step S207, the gNB 200B transmits a handover response message to the gNB 200A.

In step S208, the gNB 200A transmits a handover command message to the UE 100. In step S209, the UE 100 performs handover from the gNB 200A to the gNB 200B.

In step S210, the UE 100 transmits, to gNB 200B, a retransmission request including the PDCP SN "13" of the MBS packet C that the UE 100 has failed to receive in step S203. The retransmission request may be a PDCP Status PDU.

Note that in the handover request of step S205, the gNB 200A (source gNB) may send the information of the SN that the UE 100 may have failed to receive (in other words, a network-initiated retransmission request). In this case, step S210 is optional.

In step S211, based on the association in step S206, the gNB 200B transmits, to the UE 100, the MBS packet C corresponding to the PDCP SN "13" for which retransmission has been requested by the UE 100.

As described above, Operation Example 2 allows the target gNB to correctly transmit (retransmit) the MBS packet that the UE 100 has failed to receive from the source gNB even when the UE 100 performs handover between the gNBs whose PDCP SNs are not synchronized with each other.

Paging

Next, paging according to the embodiment will be described.

When the UE 100 in the RRC idle state or the RRC connected state performs MBS reception, the gNB 200 can receive, from the 5GC 20 (AMF 300B), a paging message addressed to the UE 100. When the gNB 200 pages the UE 100 disregarding the timing at which the UE 100 performs the MBS reception, there is the risk that the MBS reception timing and the paging reception timing may conflict with each other in the UE 100, leading to a reception error.

Operations for solving such a problem will be described. In the embodiment, the gNB 200 receives, from the 5GC 20 (AMF 300B), a paging message requesting to page the UE 100 in the RRC idle state or the RRC inactive state. The paging message includes an identifier (e.g., the TMGI) related to the MBS session received by the UE 100.

To be more specific, the AMF 300B recognizes the MBS session received by the UE 100 in the RRC idle state or the RRC inactive state, and notifies the gNB 200 what the identifier of the MBS session is when transmitting, to the gNB 200, the paging message addressed to the UE 100.

The gNB 200 pages the UE 100 in response to receipt of the paging message from the AMF 300B. In particular, the gNB 200 transmits an RRC paging message addressed to the UE 100.

Here, the gNB 200 performs paging (transmits the RRC paging message) at a timing different from the transmission timing of the MBS session received by the UE 100, based on the session identifier included in the paging message from the AMF 300B. This allows avoidance of a conflict between the MBS reception timing and the paging reception timing in the UE 100.

Figure 12:
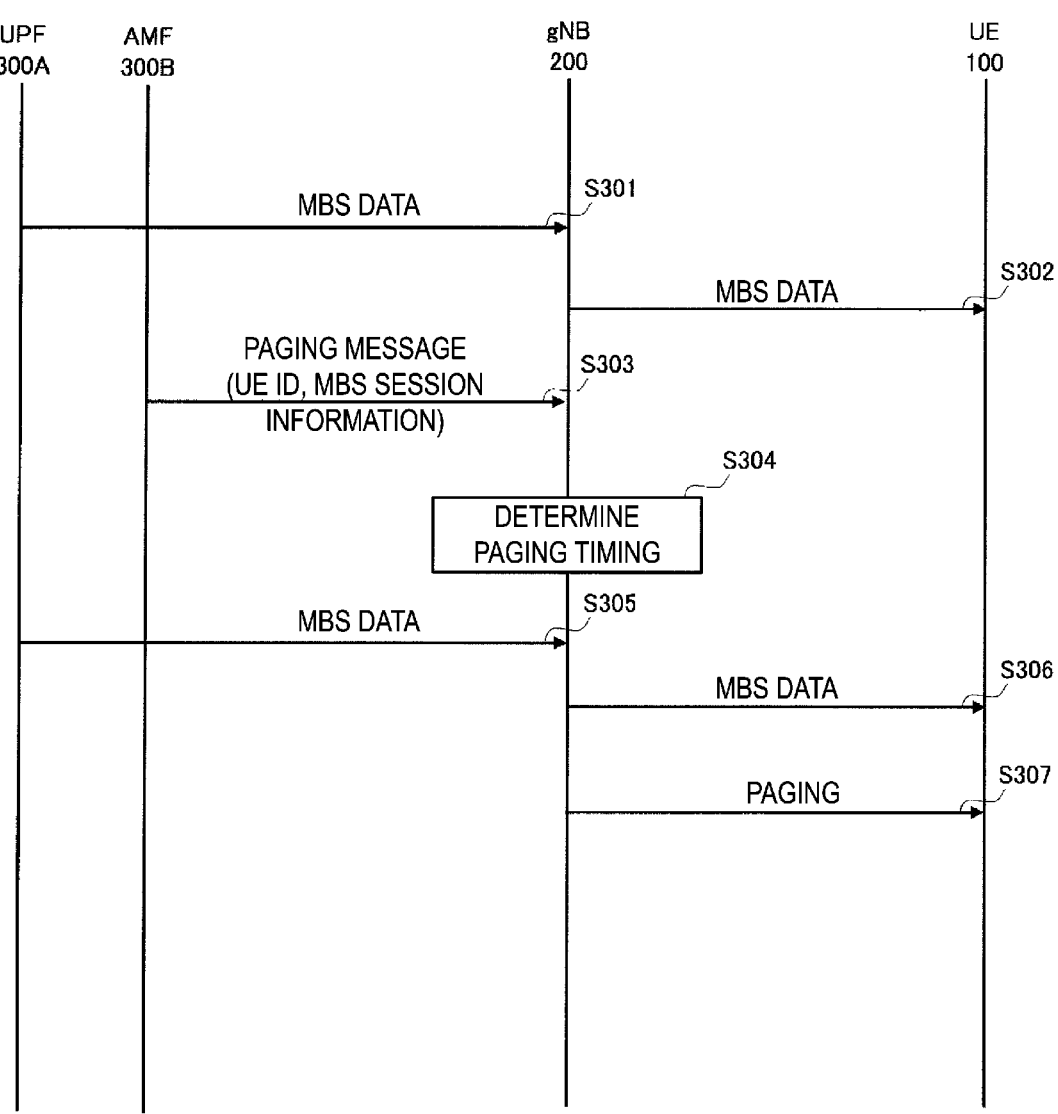
FIG. 12 is a diagram illustrating a paging operation example according to the embodiment.

FIG. 12 is a diagram illustrating a paging operation example according to the embodiment. In FIG. 12, the UE 100 is assumed to be in the RRC idle state or the RRC connected state.

As illustrated in FIG. 12, in step S301, the UPF 300A transmits the MBS data to the gNB 200 via the MBS connection. In step S302, the gNB 200 transmits, to the UE 100 by PTM, the MBS data received from the UPF 300A. Here, the timing at which the gNB 200 transmits the MBS data by PTM is assumed to be determined. For example, the gNB 200 notifies the UE 100 of the timing of an MBS transmission occasion (which may be an MBS transmission period) in advance, and the UE 100 performs MBS reception at the notified MBS transmission timing.

In step 303, the AMF 300B transmits, to the gNB 200, the paging message addressed to the UE 100. The paging message includes a set of the identifier of the UE 100 and the identifier (MBS session information) of the MBS session received by the UE 100.

In step S304, the gNB 200 determines the paging timing for the UE 100, based on the information included in the paging message from the AMF 300B. For example, the gNB 200 determines the MBS transmission timing of this MBS session, based on the MBS session information included in the paging message from AMF 300B. The gNB 200 determines a paging occasion (paging timing) for the UE 100, based on the UE identifier included in the paging message from the AMF 300B. The gNB 200 determines a paging timing that does not match the determined MBS transmission timing while avoiding a paging timing that matches the determined MBS transmission timing.

In step S305, the UPF 300A transmits the MBS data to the gNB 200 via the MBS connection. In step S306, the gNB 200 transmits, to the UE 100 by PTM, the MBS data received from the UPF 300A. Note that upon determining the paging occasion and the MBS reception occasion to collide with each other, the UE 100 may give priority to the MBS reception.

In step S307, the gNB 200 transmits the RRC paging message to the UE 100 at the paging timing determined in step S304.

In this operation example, the UE 100 is assumed to be incapable of simultaneously performing the MBS reception and the paging reception. However, the UE 100 being capable of simultaneously performing the MBS reception and the paging reception is also possible. Accordingly, the AMF 300B may further include, in the paging message, information (capability information) indicating whether the UE 100 is capable of simultaneously performing the MBS reception and the paging reception. Based on the capability information, the gNB 200 may simultaneously transmit the MBS-data and the RRC paging message to the UE 100 having this capability.

Switching to Unicast

Next, switching to unicast according to the embodiment will be described.

For example, when the UE 100 receiving MBS data transmitted by PTM performs handover and the target gNB 200 does not support PTM transmission (or MBS service), the UE 100 cannot continue to receive the MBS data. Also when the gNB 200 stops the PTM transmission (or the MBS service), the UE 100 cannot continue to receive the MBS data.

In this case, the core network (5GC 20) is in a state in which it is possible to continue to provide the MBS service, and thus establishes a unicast session (PDU session) as illustrated in FIG. 7 and switches to Individual MBS Traffic delivery, allowing the UE 100 to continue to receive the MBS data. However, in order to establish the unicast session, the UE 100 needs to make an establishment request to the 5GC 20.

In the embodiment, the gNB 200 transmits the MBS data received from the 5GC 20 to the UE 100 by PTM. Upon determining that the gNB 200 cannot continue the PTM transmission of the MBS data to the UE 100 from the gNB 200, the gNB 200 transmits a notification to the UE 100. In response to the reception of the notification, the UE 100 establishes a unicast session with the 5GC 20 for receiving the MBS data by unicast. In this way, by being prompted to establish the unicast session through the notification from the gNB 200, the UE 100 can establish the unicast session and continue to receive the MBS data.

Figure 13:
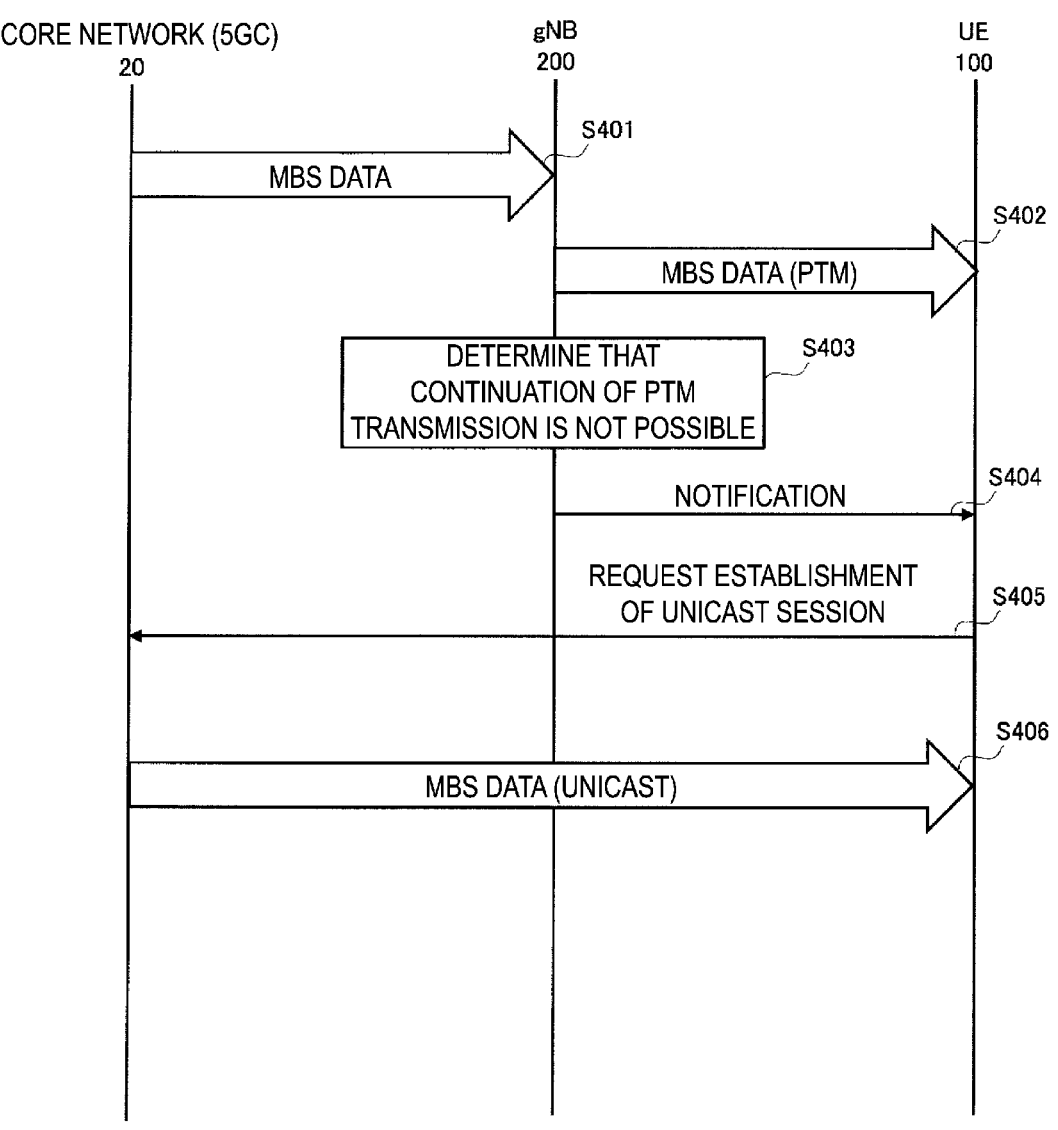
FIG. 13 is a diagram illustrating an operation example of switching to unicast according to the embodiment.

FIG. 13 is a diagram illustrating an operation example of switching to unicast according to the embodiment.

As illustrated in FIG. 13, in step S401, the 5GC 20 (UPF 300A) transmits the MBS data to the gNB 200 via the MBS connection.

In step S402, the gNB 200 transmits, to the UE 100 by PTM, the MBS data received from the 5GC 20.

In step S403, the gNB 200 determines that the gNB 200 cannot continue to provide the MBS service being received by the UE 100 using PTM. For example, the gNB 200 determines that the continued provision of the MBS service is unavailable, because the UE 100 needs to perform handover or the gNB 200 stops the PTM transmission. However, the MBS service itself continues.

In step S404, the gNB 200 notifies the UE 100 to make a service request for MBS reception by unicast.

The notification may include the identifier of the target MBS service (MBS session), for example, the TMGI. The notification may also indicate that the MBS service by PTM cannot be continued.

Assuming that the UE 100 is in the RRC connected state, UE-dedicated signaling can be used as the notification. Assuming that the UE 100 is in the RRC idle state or the RRC inactive state, a broadcasted MBS control channel or paging (RRC paging message) can be used as the notification.

In step S405, based on the notification from the gNB 200, the NAS layer of the UE 100 transmits, to 5GC 20, a session establishment request for a unicast session of the service being received (TMGI).

In step S406, the UE 100 continues to receive the MBS service by unicast. The UE 100 may notify the gNB 200 that the unicast session has been established. A notification that notifies the gNB 200 that the unicast session has been established may be sent subsequently to step S405. The notification allows the gNB 200 to make the UE 100 perform handover or to stop PTM transmission at an appropriate timing.

MBS Control Area Coverage

Next, an MBS control area coverage according to the embodiment will be described.

The UE 100 that performs the MBS reception can move across cells. For the UE 100 as described above to continue the MBS reception, an MBS control channel (MBS control information) needs to be received in a switching destination cell at least during cell switching. This leads to problems such as increase in load on and power consumption of the UE 100, and difficulty in promptly receiving MBS data from the switching destination cell. Note that the MBS control information includes configuration information (MBS configuration) for receiving the MBS traffic channel.

In the embodiment, a function (hereinafter referred to as "control area function") is introduced that enables the MBS control information to be shared within an area coverage including a plurality of cells (hereinafter referred to as "MBS control area coverage"). Thus, the same MBS control information can be used even across the plurality of cells within the MBS control area coverage, allowing the above-described problems to be solved.

In other words, the gNB 200 according to the embodiment transmits, to the UE 100, the MBS control information used to receive the MBS data via an MBS control channel of the cell of the gNB 200. The gNB 200 transmits, to the UE 100, a control area identifier indicating the MBS control area coverage where at least a part of the MBS control information is applicable. Thus, the UE 100 can recognize the MBS control area coverage wherein the MBS control information of the current cell can be used.

The UE 100 stores the MBS control information and the control area identifier from the gNB 200. The UE 100 receives the MBS data based on the stored MBS control information, within the MBS control area coverage indicated by the stored control area identifier. In this way, the MBS control information can be used even across the cells within the stored area coverage and the MBS data can be received. This allows for a decrease in load on and power consumption of the UE 100, and for the MBS data to be promptly received from the switching destination cell.

Figure 14:
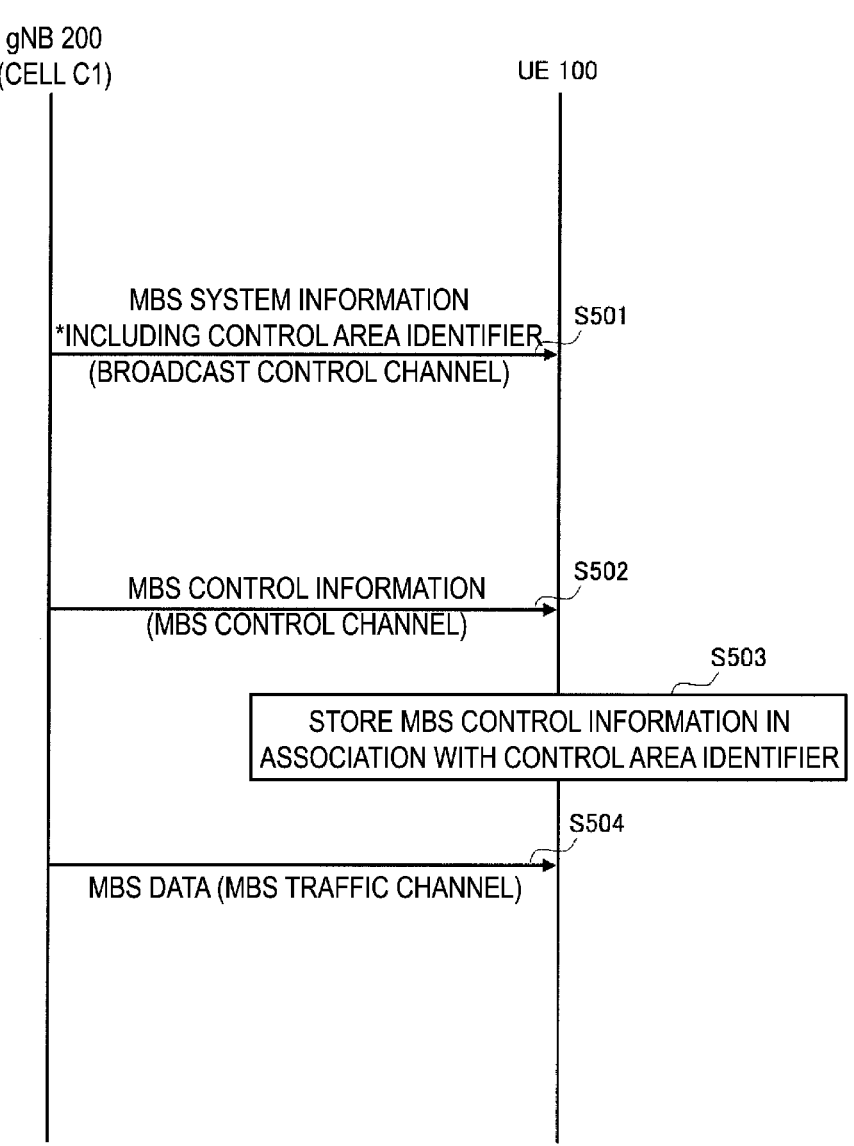
FIG. 14 is a diagram illustrating an operation of a mobile communication system according to the embodiment.

FIG. 14 is a diagram illustrating an operation of a mobile communication system according to the embodiment.

As illustrated in FIG. 14, in step S501, the gNB 200 managing the cell C1 transmits the MBS system information to the UE 100 via a Broadcast Control Channel (BCCH) of the cell C1. The MBS system information is transmitted by broadcast by using a predetermined RNTI. The UE 100 receives the MBS system information. Note that the system information may be referred to as a System Information Block (SIB).

The MBS system information includes scheduling information required for receiving the MBS control channel. For example, the MBS system information includes at least one selected from the group consisting of information indicating a period in which the content (MBS control information) of the MBS control channel can be changed, information indicating the time interval of the MBS control channel transmission in terms of the number of radio frames, information indicating an offset of the radio frame in which the MBS control channel is scheduled, and information indicating a subframe in which the MBS control channel is scheduled.

In the embodiment, the MBS system information further includes an MBS control area configuration. The MBS control area configuration includes an information element (hereinafter referred to as "applicability flag") indicating whether the control area function is applicable for the cell C1. When the control area function is applicable for the cell C1, the MBS system information includes the control area identifier. However, when the MBS system information is present, it is implicitly assumed that the control area function is applicable, and the applicability flag need not be present.

The MBS control area configuration may include expiration date information indicating a period in which the MBS control area configuration is valid (e.g., the configuration is valid until a certain radio frame, valid until a certain time, or valid within a certain time). Note that after the expiration date passes, neighbor cells constituting the MBS control area coverage may change the MBS control information of the cells. Such a change may be implemented by an apparatus used by an operator and/or by the core network. Such a change may also be implemented by signaling between the gNBs 200.

Note that the control area function may be limited in that the control area function can be enabled only when a Single Frequency Network (SFN) includes a plurality of cells including the cell C1. SFN refers to a network where a plurality of cells operated at the same frequency simultaneously transmits the same signal. The UE 100 receives a signal (synthesized signal) from the plurality of cells without identifying which cell has transmitted the signal. The control area function may be enabled for MBS control channels constituting the SFN.

The control area identifier and a system information area identifier indicating the system information area coverage may be used in common. The system information area coverage refers to an area coverage where the same MBS system information can be used. When the control area identifier and the system information area identifier are used in common, the MBS system information may include information indicating that the MBS control information conforms to the configuration of the area coverage in the MBS system information. In other words, this information indicates that the system information area identifier is treated as a control area identifier.

The cell C1 may include a plurality of MBS control channels. For example, each MBS service or each MBS service category may be provided with an MBS control channel. In this case, the MBS system information may include an MBS control area configuration for each MBS control channel. The MBS system information may include an MBS service identifier and/or an MBS control channel identifier, and an MBS control area configuration associated with the identifier. A network slice identifier associated with the MBS control channel may be included in the MBS system information instead of or in addition to the MBS control area configuration.

The UE 100 recognizes the scheduling of the MBS control channel based on the MBS system information received from the gNB 200 in step S501. The UE 100 stores the MBS control area configuration included in the MBS system information.

In step S502, the gNB 200 transmits the MBS control information via the MBS control channel following the scheduling in accordance with the MBS system information transmitted in step S501. The MBS control information is transmitted by broadcast (or multicast) using a predetermined RNTI. The transmission of the MBS control information may be performed by unicast using the C-RNTI (i.e., UE-dedicated configuration).

The MBS control information includes a list of scheduling information for the MBS traffic channels. The MBS traffic channel is provided for each MBS service. The scheduling information for the MBS traffic channel includes, for example, an MBS service identifier (e.g., TMGI) and a group RNTI corresponding to the MBS traffic channel, and scheduling information (Discontinuous Reception (DRX) information) for the MBS traffic channel. Group RNTIs are mapped to MBS service identifiers on a one-to-one basis.

In step S503, the UE 100 stores the MBS control information received from the gNB 200 in step S502 in association with the MBS control area configuration (at least the control area identifier) included in the MBS control information received from the gNB 200 in step S501. The UE 100 recognizes the scheduling of the MBS traffic channel based on the MBS control information received from the gNB 200 in step S502. For example, the UE 100 recognizes the scheduling of the MBS traffic channel corresponding to the MBS service in which the UE 100 takes interest, and attempts to receive the MBS traffic channel.

In step S504, the gNB 200 transmits the MBS data via the MBS traffic channel following the scheduling in accordance with the MBS control information transmitted in step S502. The MBS data is transmitted by multicast (or broadcast) using the group RNTI. The UE 100 receives the MBS data of the MBS traffic channel corresponding to the MBS service in which the UE 100 takes interest.

Figure 15:
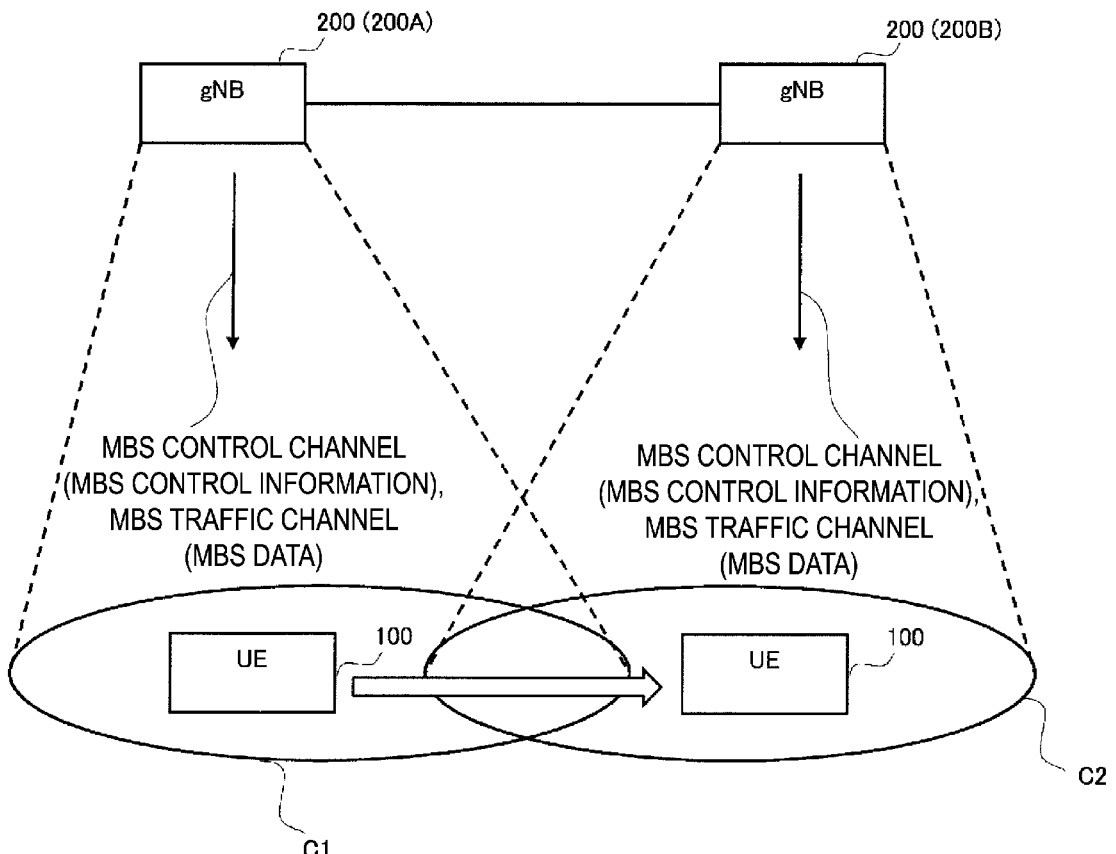
FIG. 15 is a diagram illustrating an operation performed when a UE 100 moves from a cell C1 to a cell C2 according to the embodiment.

Next, a case will be described below in which the UE 100 moves from the cell C1 to the cell C2 corresponding to another cell (neighbor cell) after the operation described above. FIG. 15 is a diagram illustrating an operation performed when the UE 100 moves from the cell C1 to the cell C2 according to the embodiment. FIG. 15 illustrates an example in which the cell C1 is managed by the gNB 200A and the cell C2 is managed by the gNB 200B.

As illustrated in FIG. 15, the UE 100 performs handover or cell reselection when moving from the cell C1 to the cell C2. The handover refers to a cell switching operation of the UE 100 in the RRC connected state. The cell reselection refers to a cell switching operation of the UE 100 in the RRC idle state or the RRC inactive state.

In the cell C1, the UE 100 stores the MBS control information of the cell C1 in association with the control area identifier (see step S503 in FIG. 14). Before cell switching from the cell C1 to the cell C2, the UE 100 receives the MBS system information transmitted by the broadcast control channel of the cell C2, and acquires the MBS control area configuration in the MBS system information.

Here, when an applicability flag in the acquired MBS control area configuration is on (i.e., the control area function is applicable for the cell C2), the UE 100 determines whether the control area identifier in the acquired MBS control area configuration (the control area identifier of the cell C2) matches the control area identifier stored in the UE 100 (the control area identifier of the cell C1). When the control area identifiers match, the UE 100 determines that the MBS control information stored in the UE 100 (the MBS control information of the cell C1) is valid, and does not receive (skips) the MBS control channel of the cell C2. Based on the MBS control information stored in the UE 100 (the MBS control information of the cell C1), the UE 100 attempts to receive the MBS traffic channel of the cell C2, and receives the MBS data from the cell C2.

In this way, upon reading the system information of the cell C2 to determine that the MBS control area coverage is identical, the UE 100 can determine that the MBS control information of the cell C1 is valid in the cell C2, and can attempt to receive the MBS traffic channel of the cell C2 without receiving the MBS control channel of the cell C2. This reduces the time during which the MBS reception is suspended.

Figure 16:
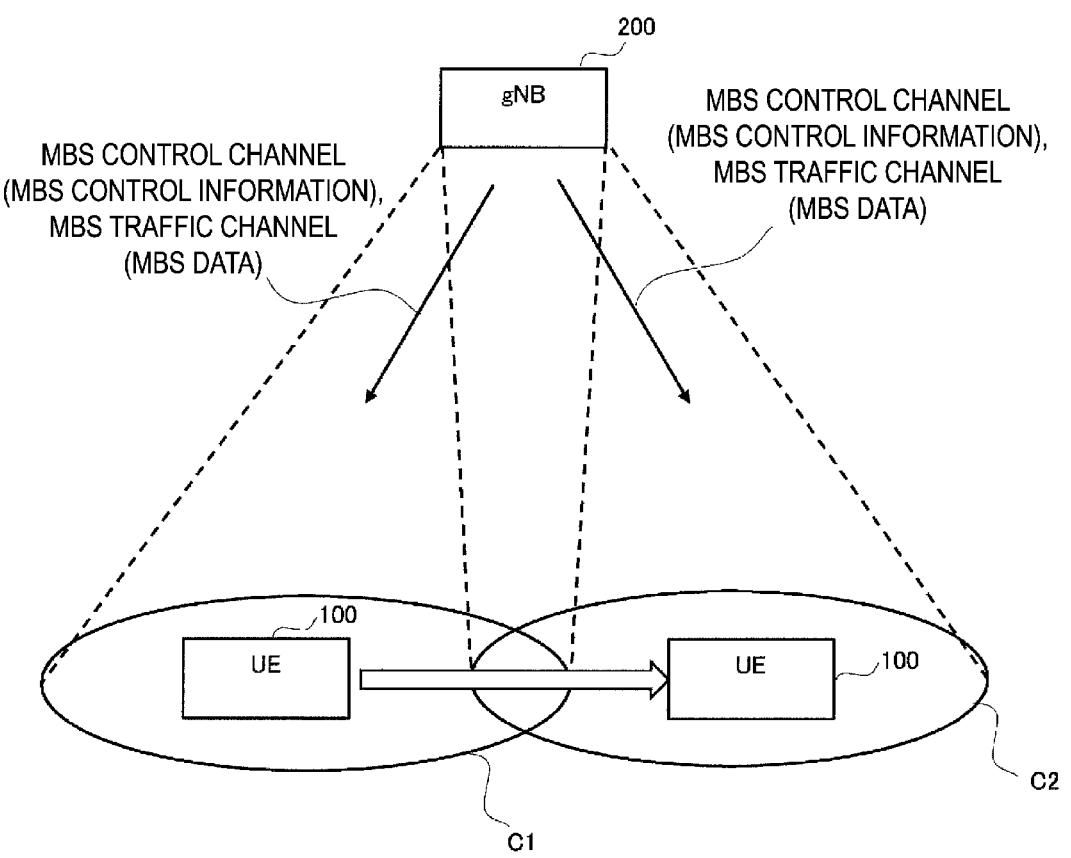
FIG. 16 is a diagram illustrating an operation performed when the UE 100 moves from the cell C1 to the cell C2 according to the embodiment.

Note that in the example illustrated in FIG. 15, an example is described in which the cell C1 and the cell C2 are managed by separate gNBs 200, but both the cell C1 and the cell C2 may also be managed by the same gNB 200 as illustrated in FIG. 16.

As illustrated in FIGS. 15 and 16, when the UE 100 moves from the cell C1 to the cell C2, the UE 100 can perform the operation of acquiring the control area identifier of the cell C2 before moving to the cell C2 while performing the MBS reception from the cell C1. When the UE 100 is assumed to include only one reception device, the operation as described above can be difficult. For example, the UE 100 needs to temporarily suspend the MBS reception from cell C1 to acquire the control area identifier of the cell C2.

Thus, the gNB 200 (cell C1) may transmit, to the UE 100, neighbor cell information for determining whether the cell C2 (neighbor cell) belongs to the same MBS control area coverage as the cell C1. The UE 100 can recognize whether the cell C2 (neighbor cell) belongs to the same MBS control area coverage as the cell C1 based on the neighbor cell information from the cell C1. For example, after receiving and storing the neighbor cell information, the UE 100 determines whether it is necessary to acquire the MBS control information from the neighbor cell during cell switching. For example, when the cell C2 (neighbor cell) belongs to the same MBS control area coverage as the cell C1, the UE 100 does not acquire (skips) the control area identifier of the cell C2.

The gNB 200 (cell C1) may transmit the neighbor cell information in the MBS system information via the broadcast control channel of the cell C1, or may transmit the neighbor cell information via the MBS control channel of the cell C1.

The neighbor cell information includes the control area identifier of the neighbor cell (cell C2). The neighbor cell information may include a cell identifier and/or frequency identifier and/or an MBS service identifier of the neighbor cell (cell C2), and a control area identifier associated with the identifier. When the cell C2 is provided with a plurality of MBS control channels, the neighbor cell information may include the MBS control channel identifier and the control area identifier associated with the identifier. Alternatively, the neighbor cell information may be limited to a neighbor cell belonging to an MBS control area coverage the same as or different from that of the cell C1, and may include the cell identifier and/or frequency identifier of the neighbor cell. The neighbor cell information may further include a system information area identifier indicating a system information area coverage of the neighbor cell.

In the embodiment, the UE 100 receives, from the cell C1, the MBS control information used to receive the MBS data and the control area identifier indicating the MBS control area coverage in which at least a part of the MBS control information is applicable, and then re-receives the MBS control information when determining that a predetermined condition related to the MBS control area coverage is satisfied.

Figure 17:
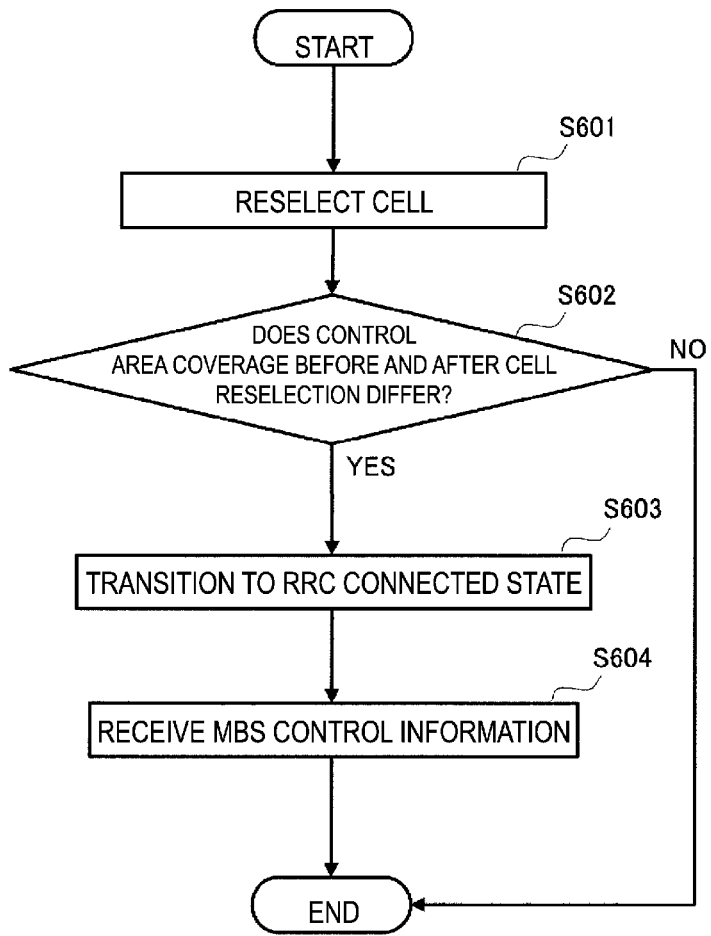
FIG. 17 is a diagram illustrating Operation Example 1 related to re-reception of MBS control information according to the embodiment.

FIG. 17 is a diagram illustrating Operation Example 1 related to re-reception of the MBS control information according to the embodiment.

As illustrated in FIG. 17, in step S601, the UE 100 in the RRC idle state or the RRC inactive state performs cell reselection to another cell (cell C2) and acquires the control area identifier indicating the MBS control area coverage to which the other cell (cell C2) belongs.

In step S602, the UE 100 determines whether the predetermined condition related to the MBS control area coverage is satisfied. In Operation Example 1, the predetermined condition is that the control area identifier received from the cell C1 is different from the control area identifier received from the other cell (cell C2), in other words, that the MBS control area coverage to which the cell C1 belongs is different from the MBS control area coverage to which the other cell (cell C2) belongs.

When the predetermined condition is determined to be satisfied (step S602: YES), the UE 100 transitions to the RRC connected state in the other cell (cell C2) in step S603. To be more specific, the UE 100 establishes an RRC connection to the other cell (cell C2) when desiring to continue reception of the MBS service being received. For example, in the RRC idle state, the UE 100 transmits an RRC Setup Request message to the other cell (cell C2). In the RRC inactive state, the UE 100 transmits an RRC Resume Request message to the other cell (cell C2).

In step S603, the UE 100 may notify the other cell (cell C2) the UE 100 wishes to receive at least one of the MBS control information (MBS configuration) for the RRC idle state or the RRC inactive state, and an MBS service (MBS session) of interest. In step S603, after receiving the MBS configuration, the UE 100 may notify the other cell (cell C2) that the UE 100 wishes to transition to the RRC idle state or the RRC inactive state.

In step S604, the UE 100 in the RRC connected state receives (re-receives) the MBS control information from the other cell (cell C2).

Figure 18:
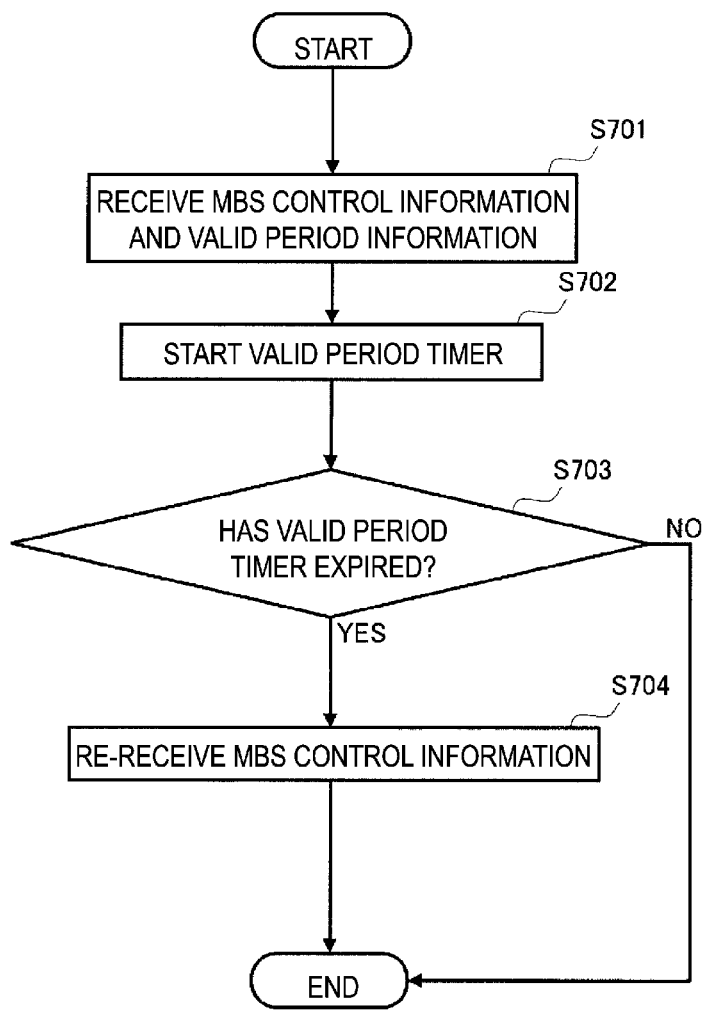
FIG. 18 is a diagram illustrating Operation Example 2 related to re-reception of the MBS control information according to the embodiment.

FIG. 18 is a diagram illustrating Operation Example 2 related to the MBS control information according to the embodiment.

As illustrated in FIG. 18, in step S701, the UE 100 receives, from the cell C1, MBS control information (MBS configuration information) and information (valid period information) indicating a valid period of the MBS control information. Determining such a valid period facilitates a change in the MBS configuration from the viewpoint of the network. This is because a change in the MBS configuration suspends the MBS reception of the UE 100. Therefore, determining the valid period provides a possibility for changing the MBS configuration within a certain period.

In step S702, the UE 100 starts a valid period during which a specific valid period is clocked.

In step S703, the UE 100 determines whether a predetermined condition related to the MBS control area coverage is satisfied. In Operation Example 2, the predetermined condition is that the valid period expires within the control area coverage to which the cell C1 belongs.

When the predetermined condition is determined to be satisfied (step S703: YES), the UE 100 receives (re-receives) the MBS control information from the cell within the control area coverage to which the cell C1 belongs in step S704. For example, in the UE-dedicated configuration (Dedicated config.), the UE 100 establishes the RRC connection as in Operation Example 1. In a broadcast configuration (Broadcast config.), the UE 100 re-acquires the broadcasted MBS control channel.

Other Embodiments

In the embodiments described above, an example is described in which the base station is an NR base station (gNB), but the base station may also be an LTE base station (eNB). The base station may also be a relay node such as an Integrated Access and Backhaul (IAB) node. The base station may be a distributed unit (DU) of the IAB node.

The embodiments described above mainly assume inter-base station communication, but intra-base station communication may also be assumed. For example, a base station may be separated into a CU and a DU, and the CU and the DU may communicate with each other. In this case, the above-described Xn interface may be interpreted as an F1 interface being a CU-DU interface, and the above-described various messages and information may be transmitted and received via the F1 interface. Each of the above-described gNB 200A and gNB 200B may be interpreted as the CU and/or DU.

Furthermore, the CU may be separated into a CU-CP and a CU-UP, and the CU-CP and the CU-UP may communicate with each other. In this case, the above-described Xn interface may be interpreted as an E1 interface being an interface between the CU-CP and the CU-UP, and the above-described various messages and information may be transmitted and received via the E1 interface. Each of the above-described gNB 200A and gNB 200B may be interpreted as the CU-CP and/or CU-UP.

A program causing a computer to execute each of the processes performed by the UE 100 or the gNB 200 may be provided. The program may be recorded on a computer-readable medium. Use of the computer-readable medium enables the program to be installed on a computer. Here, the computer-readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

REFERENCE SIGNS

10: NG-RAN (5G RAN)
20: 5GC (5G CN)

100: UE
110: Receiver
120: Transmitter
130: Controller
200: gNB
210: Transmitter
220: Receiver
230: Controller
240: Backhaul communicator

The invention claimed is:

1. A communication control method used in a mobile communication system for providing a multicast broadcast service (MBS) from a base station to user equipment, the communication control method comprising:

receiving, by the user equipment from a cell, MBS control information used to receive MBS data;

configuring the user equipment with the MBS control information so that the user equipment receives an MBS multicast session in an RRC inactive state;

performing, by the user equipment in an RRC (Radio Resource Control) inactive state, cell reselection to another cell; and determining, by the user equipment, whether the MBS control information received from the cell is available in the another cell, wherein the user equipment in the RRC inactive state is configured to transition to an RRC connected state in the another cell in response to determining that the MBS control information received from the cell is not available in the another cell.

2. A user equipment comprising:

a receiver configured to receive, from a cell, multicast broadcast service (MBS) control information used to receive MBS data; and a processor configured to:

configure the user equipment with the MBS control information so that the user equipment receives an MBS multicast session in an RRC inactive state;

perform cell reselection to another cell while the user equipment is in an RRC (Radio Resource Control) inactive state;

determine whether the MBS control information received from the cell is available in the another cell; and in response to determining that the MBS control information received from the cell is not available in the another cell, transition the user equipment from the RRC inactive state to an RRC connected state.

* * * * *